United States Patent
Buch et al.

(10) Patent No.: US 11,727,525 B2
(45) Date of Patent: Aug. 15, 2023

(54) TASK MERGING

(71) Applicant: Imagination Technologies Limited, Kings Langley (GB)

(72) Inventors: Roger Hernando Buch, Hertfordshire (GB); Panagiotis Velentzas, Hertfordshire (GB); Richard Broadhurst, Hertfordshire (GB); Xile Yang, Rickmansworth (GB); John W. Howson, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 244 days.

(21) Appl. No.: 17/333,695

(22) Filed: May 28, 2021

(65) Prior Publication Data

US 2022/0012841 A1  Jan. 13, 2022

(30) Foreign Application Priority Data

May 28, 2020 (EP) .................................... 20386027

(51) Int. Cl.

| | |
|---|---|
| *G06T 1/20* | (2006.01) |
| *G06F 9/48* | (2006.01) |
| *G06F 9/50* | (2006.01) |
| *G06F 9/52* | (2006.01) |
| *G06F 12/02* | (2006.01) |
| *G06T 1/60* | (2006.01) |

(52) U.S. Cl.
CPC .............. *G06T 1/20* (2013.01); *G06F 9/4881* (2013.01); *G06F 9/5038* (2013.01); *G06F 9/52* (2013.01); *G06F 12/0261* (2013.01); *G06T 1/60* (2013.01)

(58) Field of Classification Search
CPC ............. G06T 1/20; G06T 1/60; G06T 11/40; G06T 15/005; G06F 9/4881; G06F 9/5038; G06F 9/52; G06F 12/0261; G06F 12/0875

See application file for complete search history.

(56) References Cited

U.S. PATENT DOCUMENTS

| | | | |
|---|---|---|---|
| 8,046,761 B2 | 10/2011 | Howson | |
| 10,210,596 B2 | 2/2019 | Redshaw | |
| 2012/0201467 A1* | 8/2012 | Akenine-Moller | ... G06T 15/005 382/199 |
| 2015/0325037 A1* | 11/2015 | Lentz | .................... G06T 15/005 345/419 |
| 2015/0348306 A1 | 12/2015 | Yang et al. | |
| 2019/0244323 A1 | 8/2019 | Goodman et al. | |
| 2019/0244418 A1* | 8/2019 | Surti | ....................... G06T 15/80 |
| 2020/0065104 A1 | 2/2020 | Kenney et al. | |
| 2020/0104967 A1* | 4/2020 | Maiyuran | ............. G06T 15/005 |

* cited by examiner

*Primary Examiner* — Jacinta M Crawford
*Assistant Examiner* — Donna J. Ricks
(74) *Attorney, Agent, or Firm* — Potomac Law Group, PLLC; Vincent M De Luca (57) ABSTRACT

Methods and apparatus for merging tasks in a graphics pipeline in which, subsequent to a trigger to flush a tag buffer, one or more tasks from the flushed tag buffer are generated, each task comprising a reference to a program and plurality of fragments on which the program is to be executed, wherein a fragment is an element of a primitive at a sample position. It is then determined whether merging criteria are satisfied and if satisfied, one or more fragments from a next tag buffer flush are added to a last task of the one or more tasks generated from the flushed tag buffer.

19 Claims, 5 Drawing Sheets

TASK MERGING

BACKGROUND

When rendering an image of a 3D scene in a graphics processing system, there may be two or more primitives that overlap at any particular sample position, where there may be a 1:1 correspondence between sample positions and pixel positions in the final rendered image. The term 'fragment' may be used to refer to an element of a primitive at a sample position. Where primitives, and hence fragments, overlap at a sample position, a depth test may be used to determine which primitive (and hence which fragment) is visible at any sample position and where the front-most primitive is not opaque at the sample position (e.g. where the front-most fragment is punch-through), blending may be performed to combine the data for the translucent fragment and the fragment it partially occludes (i.e. to combine the data, such as colour data, for the front-most non-opaque fragment and the fragment behind it—where 'front' and 'back' may be application specific). Foliage simulation is an example of where there are often many overlapping fragments and in particular overlapping punch-through and opaque fragments. The term 'punch-through' refers to fragments where, unless depth update is disabled, there is a feedback loop to a depth test after performing an alpha test.

There are a number of different ways of rendering 3D scenes, including tile-based rendering and immediate-mode rendering. In a graphics processing system that uses tile-based rendering, the rendering space is divided into one or more of tiles (e.g. rectangular areas) and the rendering is then performed tile-by-tile. This typically increases the rendering speed as well as reducing the framebuffer memory bandwidth required, the amount of on-chip storage required for hidden surface removal (HSR) and the power consumed.

The embodiments described below are provided by way of example only and are not limiting of implementations which solve any or all of the disadvantages of known graphics processing systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and apparatus for merging tasks in a graphics pipeline are described. The method comprises, subsequent to a trigger to flush a tag buffer, generating one or more tasks from the flushed tag buffer, each task comprising a reference to a program and plurality of fragments on which the program is to be executed, wherein a fragment is an element of a primitive at a sample position. It then determined whether merging criteria are satisfied and if satisfied, one or more fragments from a next tag buffer flush are added to a last task of the one or more tasks generated from the flushed tag buffer.

A first aspect provides a method of generating tasks in a tile-based graphics pipeline, the method comprising, subsequent to a trigger to flush a tag buffer: generating one or more tasks from the flushed tag buffer, each task comprising a reference to a program and one or more fragments on which the program is to be executed, wherein a fragment is an element of a primitive at a sample position; determining whether predefined merging criteria are satisfied; and in response to determining that the merging criteria are satisfied, adding one or more fragments from a next tag buffer flush to a last task of the one or more tasks generated from the flushed tag buffer.

The merging criteria may comprise a condition that the trigger to flush the tag buffer is not an end of a tile.

The merging criteria may comprise an occupancy threshold for the last task generated from the flushed tag buffer. The primitives may be grouped into primitive blocks and the occupancy threshold is defined in terms of one or more of: a maximum number of fragments in the task; a maximum number of primitives in the task; and a maximum number of primitive blocks in the task.

Adding one or more fragments from a next tag buffer flush to a last task of the one or more tasks generated from the flushed tag buffer may comprise: storing the last task of the one or more tasks generated from the flushed tag buffer; and subsequent to a next trigger to flush a tag buffer, adding one or more one or more fragments from a next tag buffer flush to the stored last task.

The method may further comprise, in response to the trigger to flush a tag buffer and prior to generating the one or more tasks from the flushed tag buffer: determining whether there is a stored last task from an immediately previous tag buffer flush; and in response to determining that there is a stored last task from an immediately previous tag buffer flush, adding one or more fragments from the tag buffer to the stored last task.

The graphics pipeline may comprise a depth buffer, a pass may comprise a group of one or more tasks, the graphics pipeline may enforce that all tasks from a pass finish updating the depth buffer prior to any tasks from a next pass updating the depth buffer and the method may further comprise, after adding one or more fragments from the tag buffer to the stored last task, releasing the stored last task as a separate pass.

The graphics pipeline may comprise a depth buffer, a pass may comprise a group of one or more tasks, the graphics pipeline may enforce that all tasks from a pass finish updating the depth buffer prior to any tasks from a next pass updating the depth buffer and the method may further comprise, after adding one or more fragments from the tag buffer to the stored last task to generate a further populated stored last task and in response to determining that there is no overlap in fragments between the further populated stored last task and any tasks in a pass comprising at least one other task generated in response to the immediately previous tag buffer flush, releasing the further populated stored last task as part of that pass.

The method may further comprise, in response to determining that there is an overlap in fragments between the further populated stored last task and any tasks in a pass comprising at least one other task generated in response to the immediately previous tag buffer flush, releasing the further populated stored last task as a separate pass.

The graphics pipeline may comprise a depth buffer, a pass may comprise a group of one or more tasks, the graphics pipeline may enforce that all tasks from a pass finish updating the depth buffer prior to any tasks from a next pass updating the depth buffer and the method may further comprise, after adding one or more fragments from the tag buffer to the stored last task to generate a further populated stored last task and in response to determining that there is no overlap in fragments between the further populated stored last task and any tasks in a pass comprising at least one other task generated in response to the trigger to flush the tag buffer, releasing the stored last task as part of the that pass.

The method may further comprise, in response to determining that there is an overlap in fragments between the further populated stored last task and any tasks in a pass comprising at least one other task generated in response to the trigger to flush the tag buffer and that there is no overlap in fragments between the further populated stored last task and any tasks in a pass comprising at least one other task generated in response to the immediately previous tag buffer flush, releasing the further populated stored last task as part of the pass comprising at least one other task generated in response to the immediately previous tag buffer flush.

The method may further comprise, in response to determining that there is (a) an overlap in fragments between the further populated stored last task and any tasks in a pass comprising at least one other task generated in response to the trigger to flush the tag buffer and/or (b) that there is an overlap in fragments between the further populated stored last task and any tasks in a pass comprising at least one other task generated in response to the immediately previous tag buffer flush, releasing the further populated stored last task as a separate pass.

Adding one or more fragments from a tag buffer flush to the stored last task may comprise: selecting a fragment from the tag buffer flush; determining whether the selected fragment satisfies predefined addition criteria; and in response to determining that the selected fragment satisfies the predefined criteria, adding the selected fragment to the stored last task.

The predefined addition criteria may specify a maximum number of primitives per task.

Primitives may be grouped into primitive blocks and the predefined addition criteria may specify a maximum number of primitive blocks per task.

The predefined addition criteria may prevent intra-task overlap of fragments.

The predefined addition criteria may prevent inter-task overlap of fragments.

A second aspect provides a tile-based graphics pipeline comprising: a tag buffer; and hardware logic arranged, subsequent to a trigger to flush the tag buffer, to: generate one or more tasks from the flushed tag buffer, each task comprising a reference to a program and one or more fragments on which the program is to be executed, wherein a fragment is an element of a primitive at a sample position; determine whether predefined merging criteria are satisfied; and in response to determining that the merging criteria are satisfied, add one or more fragments from a next tag buffer flush to a last task of the one or more tasks generated from the flushed tag buffer.

The hardware logic may be located within the tag buffer.

The tile-based graphics pipeline may further comprise a texture/shading unit and wherein the hardware logic is located between the tag buffer and the texture/shading unit.

A third aspect provides a tile-based graphics pipeline configured to perform the method of the first aspect.

The graphics pipeline may be embodied in hardware on an integrated circuit. There may be provided a method of manufacturing, at an integrated circuit manufacturing system, a graphics pipeline. There may be provided an integrated circuit definition dataset that, when processed in an integrated circuit manufacturing system, configures the system to manufacture a graphics pipeline. There may be provided a non-transitory computer readable storage medium having stored thereon a computer readable description of an integrated circuit that, when processed, causes a layout processing system to generate a circuit layout description used in an integrated circuit manufacturing system to manufacture a graphics pipeline.

There may be provided an integrated circuit manufacturing system comprising: a non-transitory computer readable storage medium having stored thereon a computer readable integrated circuit description that describes the graphics pipeline; a layout processing system configured to process the integrated circuit description so as to generate a circuit layout description of an integrated circuit embodying the graphics pipeline; and an integrated circuit generation system configured to manufacture the graphics pipeline according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Figure 1:
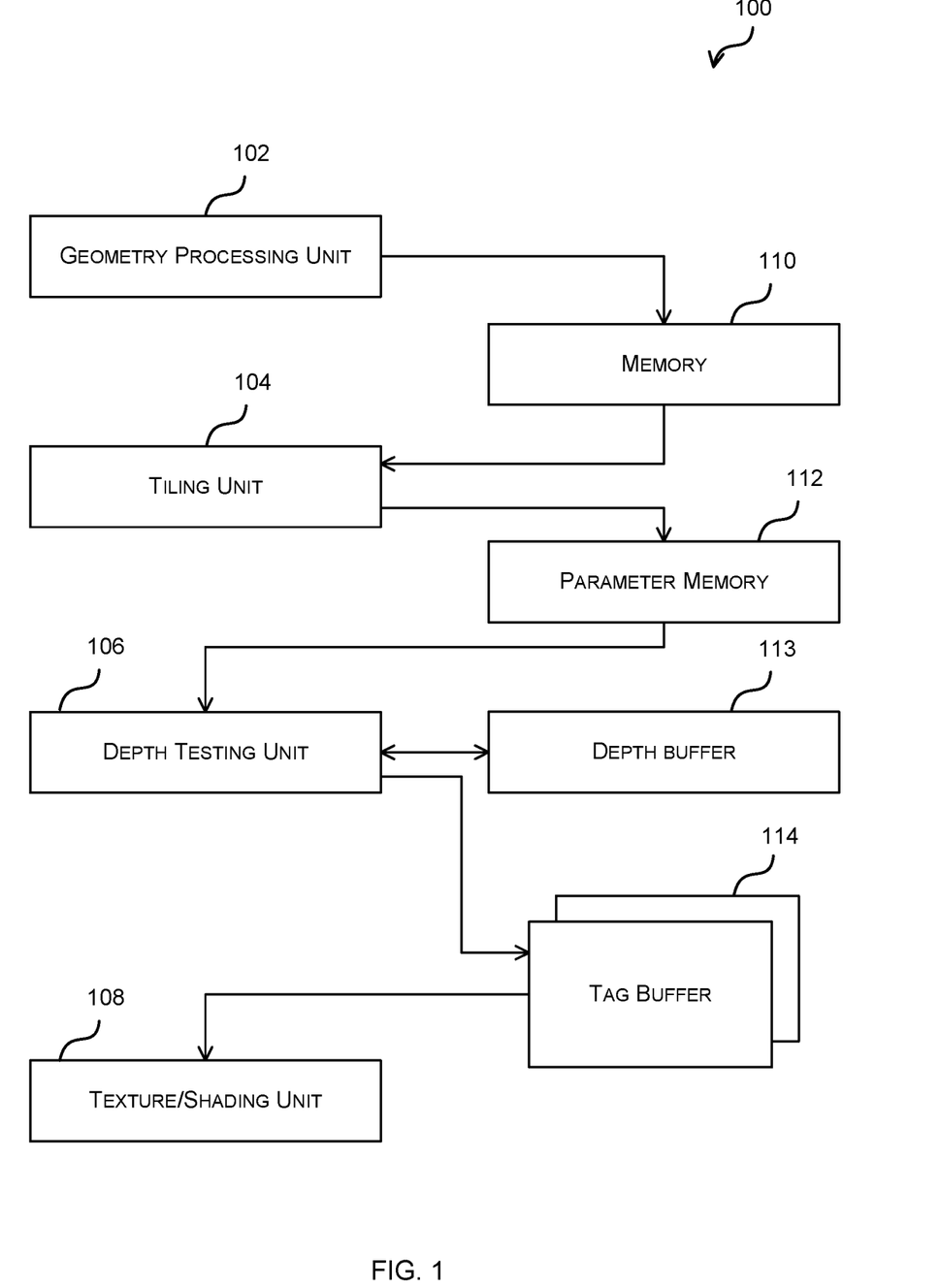
FIG. 1 shows a schematic diagram of an example graphics pipeline.

FIG. 1 shows a schematic diagram of an example graphics processing unit (GPU) pipeline 100 which may be implemented in hardware within a GPU and which uses a tile-based rendering approach. As shown in FIG. 1, the pipeline 100 comprises a geometry processing unit 102, a tiling unit 104, a depth testing unit 106 (which may also be referred to as a hidden surface removal unit) and a texturing/shading unit (TSU) 108. The pipeline 100 also comprises one or more memories and buffers, such as a first memory 110, a second memory 112 (which may be referred to as parameter memory), a depth buffer 113 and one or more tag buffers 114. Some of these memories and buffers may be implemented on-chip (e.g. on the same piece of silicon as some or all of the GPU 102, tiling unit 104, depth testing unit 106 and TSU 108) and others may be implemented separately. It will be appreciated that the pipeline 100 may comprise other elements not shown in FIG. 1.

The geometry processing unit 102 receives image geometrical data for an application and transforms it into domain space (e.g. UV texture coordinates) as well as performs tessellation, where required. The operations performed by the graphics processing unit 102, aside from tessellation, comprise per-vertex transformations on vertex attributes (where position is just one of these attributes) performed by a vertex shader and these operations may also be referred to as 'transform and lighting' (or 'transform and shading'). The geometry processing unit 102 may, for example, comprise a tessellation unit and a vertex shader, and outputs data which is stored in memory 110. This data that is output may comprise primitive data, where the primitive data may comprise a plurality of vertex indices (e.g. three vertex indices) for each primitive and a buffer of vertex data (e.g. for each vertex, a UV coordinate and in various examples, other vertex attributes). Where indexing is not used, the primitive data may comprise a plurality of domain vertices (e.g. three domain vertices) for each primitive, where a domain vertex may comprise only a UV coordinate or may comprise a UV coordinate plus other parameters (e.g. a displacement factor and optionally, parent UV coordinates).

The tiling unit 104 reads the data generated by the geometry processing unit 102 (e.g. by a tessellation unit within the geometry processing unit 102) from memory 110, generates per-tile display lists and outputs these to the parameter memory 112. Each per-tile display list identifies, for a particular tile, those primitives which are at least partially located within, or overlap with, that tile. These display lists may be generated by the tiling unit 104 using a tiling algorithm. Subsequent elements within the GPU pipeline, such as the depth testing unit 106, can then read the data from parameter memory 112. The back end of the tiling unit 104 may also group primitives into primitive blocks.

The depth testing unit 106 accesses the per-tile display lists from the parameter memory 112 and performs depth tests on fragments of the primitives in the tile. Current depth values (which may be referred to as 'depth state') may be stored in and accessed from the depth buffer 113. If the depth test unit 106 determines that a fragment contributes to the image data, then one or more identifiers associated with the fragment, each referred to as a tag, are written to the tag buffer 114. The one or more identifiers may comprise a tag that identifies the primitive and a tag that identifies the primitive block that the primitive is part of. If, however, the fragment is found not to contribute to the image data (e.g. because its depth indicates that the fragment is further away than, or is occluded by, an opaque fragment, which may be referred to as an occluder, that is already stored in the tag buffer), then the tag associated with the fragment is not written to the tag buffer 114.

The tag buffer 114 holds tags for the fragments from the front-most primitives (i.e. those closest to the viewpoint, which may also be referred to as 'near-most') for each sample position in a tile. To store a tag for a fragment in the tag buffer 114, an identifier for the primitive of which the fragment is part is stored in a location that corresponds to the fragment and there is a 1:1 association between fragments and positions in the tag buffer. A fragment is therefore defined by the combination of the primitive identifier (or tag) and the position at which that identifier is stored in the tag buffer. The action of storing a fragment in the tag buffer therefore refers to the storing of the identifier for the primitive of which the fragment is part in a location in the tag buffer that corresponds to the sample position of the fragment.

The texturing/shading unit (TSU) 108 performs texturing and/or shading tasks. The term 'task' is used herein to refer to a group of one or more data-items (e.g. pixels or samples) and the work that is to be performed upon those data-items. For example, a task may comprise or be associated with a program or reference to a program (e.g. a shader) in addition to a set of data that is to be processed according to the program, where this set of data may comprise one or more data-items. The term 'instance' (or 'program instance') is used herein to refer to individual instances that take a path through the code. An instance therefore refers to a single data-item (e.g. a single fragment or pixel, where in the context of the methods described herein, a fragment becomes a pixel when it has updated the output buffer, which may alternatively be known as the on-chip frame buffer or partition store) and a reference (e.g. pointer) to a program (e.g. a shader) which will be executed on the data-item. A task therefore comprises one or more instances and typically comprises a plurality of instances. In the context of the methods described herein, nearly all instances (e.g. except for the end of tile instance) correspond to a fragment.

Tasks are generated when the tag buffer 114 is flushed through to the TSU 108. There are a number of situations which trigger the flushing of the tag buffer 114 and these are described below. When the tag buffer 114 is flushed, tasks are formed by scanning out (or gathering) data relating to fragments from the tag buffer 114 and placing them into tasks (with each fragment corresponding to a separate instance, as described above). The maximum number of instances (and hence fragments) within a task is limited by the width of SIMD structure in the graphics architecture. The efficiency of the TSU 108 (and hence the graphics pipeline 100) is increased by filling tasks as full as possible; however, there are also a number of constraints that control how fragments are packed into tasks. In current systems, the group of tasks that are generated by a single tag buffer flush operation are collectively referred to as a pass and the TSU 108 implements mechanisms that ensure that all tasks from a pass finish updating the depth buffer (e.g. do a late depth-test or feedback to the depth test after alpha testing) before any of the tasks from the next pass. This ensures that pixels are processed in the correct order and avoids hazards, such as reads or writes being performed out of order. However, the efficiency of the pipeline is reduced where tasks in the pass are not fully occupied (i.e. they contain fewer than the maximum number of instances) and the impact of this increases as the width of the SIMD structure increases (e.g. there is a bigger impact for a 128-wide SIMD structure than a 32-wide SIMD structure). Typically at least the last task in a pass will not be fully occupied (e.g. in a pipeline with a SIMD width of 128, the last task will typically contain less than 128 instances).

As shown in FIG. 1, there may be more than one tag buffer 114. This enables two operations to be implemented in parallel: (i) scanning out data from a first tag buffer that has been flushed to form tasks and (ii) storing (or accumulating)

tags into a second tag buffer. This parallel operation, which may be referred to as 'double-buffering', improves the efficiency of operation of the pipeline 100 as it is not necessary to wait for the flushing (i.e. operation (i)) to be complete before writing more tags into a tag buffer (i.e. operation (ii)).

As noted above, there are a number of situations which trigger the flushing of the tag buffer 114 and one of these situations is at the end of a tile. The tag buffer 114 is also flushed when the tag buffer is full or when tag buffer overlap occurs. Tag buffer overlap occurs when a non-opaque fragment (e.g. a translucent or punch-through fragment) is found to be in front of a previous fragment stored in the tag buffer (i.e. the non-opaque fragment is at the same sample position as the stored fragment and is closer to the viewpoint than the stored fragment), irrespective of whether the previous fragment (that is already stored) is opaque or non-opaque. Tag buffer overlap does not occur if the overlapping (i.e. front-most) fragment is opaque because in such circumstances the front-most fragment is permitted to overwrite (i.e. replace) the more distant fragment because the more distant fragment will not be visible in the final rendered image. Tag buffer overlap triggers a tag buffer flush because the blending of fragments and/or determining whether to update depth values (e.g. for punch-through fragments) is performed by the TSU 108.

The tag buffer 114 is also flushed when the tag buffer is full, i.e. when either a limit in the number of primitive tags or a limit in the number of primitive block tags in the tag buffer is reached. There are other situations which trigger the flushing and these include primitive type transitions from punch-through to opaque/translucent and before/after objects (which may be referred to as 'per-object flushing').

As noted above, there are a number of constraints that control how fragments are packed into tasks. The maximum number of instances, and hence fragments, in a task is set by the SIMD width (e.g. 128) and additionally there cannot be fragments from more than a predefined number of primitives (e.g. from no more than 8 primitives) in a single task and these primitives cannot come from more than a predefined number of primitive blocks (e.g. they may all be required to come from the same primitive block, where a primitive block may, for example, comprise up to 80 primitives). The constraint on number of primitives is a consequence of the amount of memory that is (or will be) reserved during the TSU processing of these primitives (e.g. calculating plane equations).

Described herein is an improved method of packing fragments into tasks that may be implemented in response to a tag buffer flush. As described in more detail below, the last task that is generated from a tag buffer flush is held back if it satisfies some predefined criteria (referred to herein as merging criteria) and the tag buffer flush occurs before the end of the tile. Additional fragments from the subsequent pass (i.e. fragments that are added to the tag buffer after the tag buffer flush) are then added to the held-back task such that it becomes more fully occupied. This more fully populated task may then be passed to the TSU 108 as a separate pass or the task may be merged into either the next pass (e.g. merging forwards, such that a task that might otherwise be in pass P is instead merged into pass P+1) or the original pass (e.g. merging backwards, such that the task remains in pass P). In this way, the task occupancy is increased and this improves the overall efficiency of the pipeline 100. Where this method is implemented, a restriction that is present in current systems that tasks can only contain fragments from a single tag buffer flush, is removed.

Whilst the improved method of packing fragments into tasks is described in the context of tile-based rendering, the method may also be used with other rendering methods (e.g. other deferred rendering methods).

Figure 2:
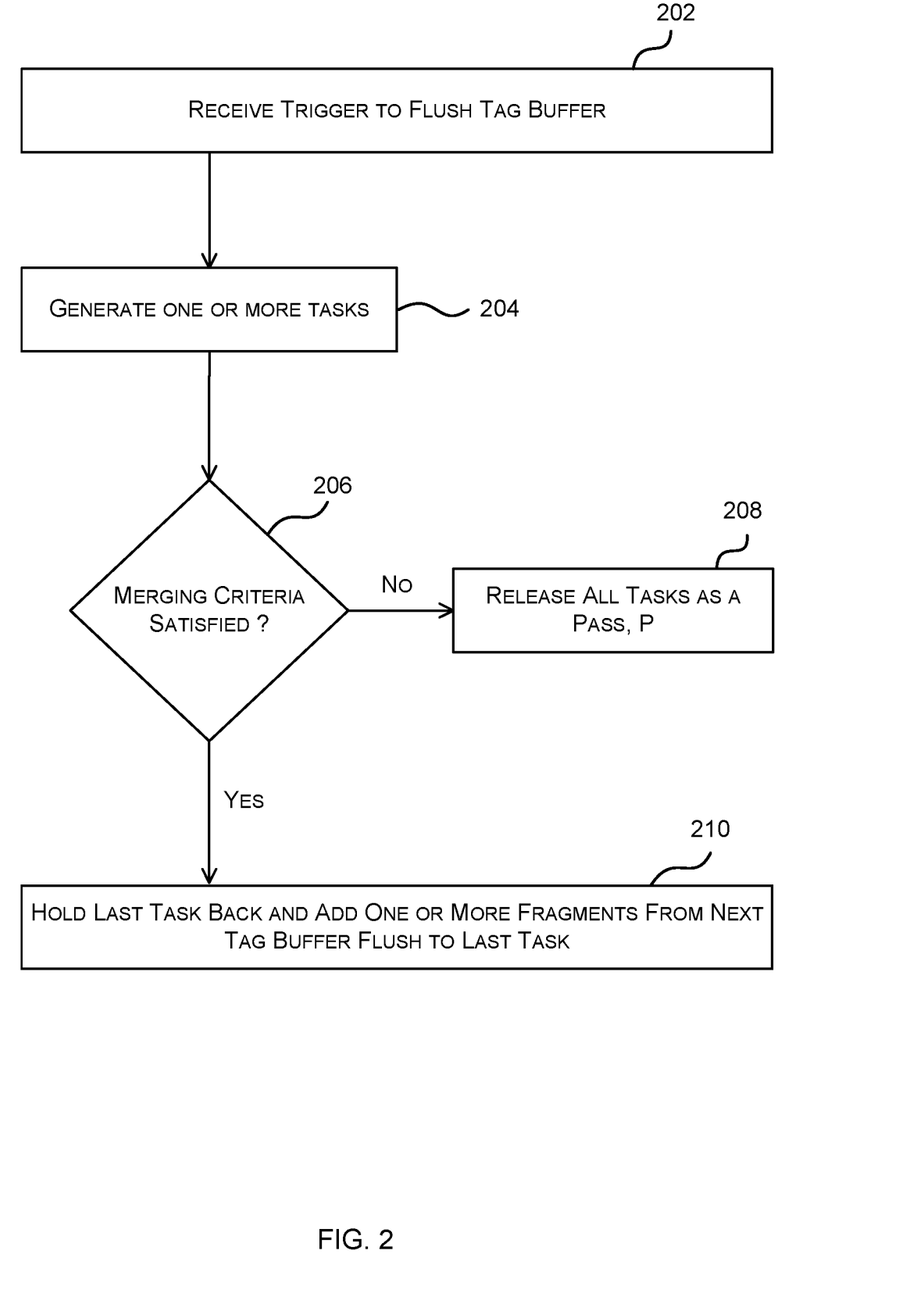
FIG. 2 is a flow diagram of a first example of an improved method of generating tasks that may be implemented in the pipeline 100 of FIG. 1.

FIG. 2 is a flow diagram of a first example of an improved method of generating tasks that may be implemented in the pipeline 100 of FIG. 1. The method may be implemented by the tag buffer 114 (e.g. by hardware in the back end of the tag buffer 114) or by hardware that sits between the tag buffer 114 and the TSU 108.

The method comprises receiving a trigger to flush a tag buffer (block 202) and in response to this, generating one or more tasks by scanning out fragments from the flushed tag buffer (block 204). Once the last task has been generated from the flushed tag buffer (in block 204), it is determined whether predefined merging criteria are satisfied (block 206). If the merging criteria are not satisfied ('No' in block 206), then all the tasks that have been generated (including the last task) are released as part of pass, P (block 208); however, if the merging criteria are satisfied ('Yes' in block 206), the last task is held back and one or more fragments are added (where possible) to the last task from the next tag buffer flush (block 210).

The merging criteria that are applied (in block 206) comprises a condition that the flush is not at the end of a tile, such that if the flush has occurred at the end of a tile the merging criteria is never satisfied ('No' in block 206) irrespective of any other criteria that may also be defined in relation to the last task that was generated (in block 204). This is because there will be no subsequent fragments that could be used to fill up the last task generated (in block 204) by this particular tag buffer flush.

The merging criteria that are applied (in block 206) to determine whether to attempt to more fully populate the held-back last task may additionally comprise any suitable criteria defined in relation to the last task. In an example, the merging criteria comprises a threshold occupancy for the last task and this may be referred to as a fullness criteria. The fullness criteria may, for example, be defined in terms of the number of instances (and hence fragments) in the task and/or the number of primitives to which the instances relate. For example, the fullness criteria may be set at 70% occupancy of instances and/or 70% occupancy of primitives.

When adding one or more fragments from the next tag buffer flush to the last (and incomplete) task from the previous tag buffer flush (in block 210), one or more criteria may be predefined to determine whether a particular fragment can be added. These criteria, which may be referred to as addition criteria, may be same as (or a subset of) those used to trigger a tag buffer flush (e.g. except for the end of a tile).

In various examples, any fragments that are added to the task from the next tag buffer flush must not correspond to the same pixel, or same sample position where there is more than one sample position per pixel, as any of the other fragments that are already in that task, i.e. there must not be any intra-task overlap of fragments. Additionally, as described above, there may be a predefined maximum number of primitives (e.g. no more than 8 primitives) and/or primitive blocks (e.g. no more than one primitive block) in a single task (e.g. any fragments that are added to the held-back last task may be required to come from primitives that are in the same primitive block as the existing fragments in the task). When data is scanned out of the tag buffer, this may be done in batches (e.g. of 8 primitives) in a first-come first-served order but preserving primitive block order and hence any fragments that are to be added to the held-back last task have a high probability of coming from the same primitive block.

In various examples, in addition to the addition criteria preventing intra-task overlap of fragments (i.e. such that fragments cannot be added where they would overlap with existing fragments in the task), the addition criteria may also prevent inter-task overlap of fragments (i.e. such that fragments can only be added where there is no overlap with fragments in any other tasks that will be released in the same pass as the further populated held-back last task).

Furthermore, as noted above, the task is formed from instances and each instance refers to a fragment (the data item) and a reference to a program (e.g. a shader) that is executed on the fragment. Consequently, fragments can only be added to the task if, as well as meeting the criteria above, the same program (e.g. the same shader) is executed on the added fragments as the existing fragments within the task. In various examples there may be other criteria that limit which fragments can be added into the task (in block 210), for example, where fragments from more than one primitive block can be included in a task, then the primitive blocks (and hence also the fragments) would need to have the same state (where the state may include the program and other parameters). The state is fixed (i.e. the same) for all primitives in a primitive block and fragments have the same state as the primitive which they came from.

If possible, fragments are added to the last task from the previous tag buffer flush until that task is fully occupied (e.g. the number of instances in the task corresponds to the SIMD width), but it may be that the limit on the number of primitives or primitive blocks per task is reached before the task is full and once this is reached, no further fragments are added to the task. In some situations, there may not be sufficient suitable fragments (i.e. fragments that meet the criteria above) to fill the last task from the previous tag buffer flush and again, in such a situation, no further fragments are added to the task. Such a limit is more likely to be reached where the triangles are smaller and hence there are fewer fragments per primitive.

Figure 3:
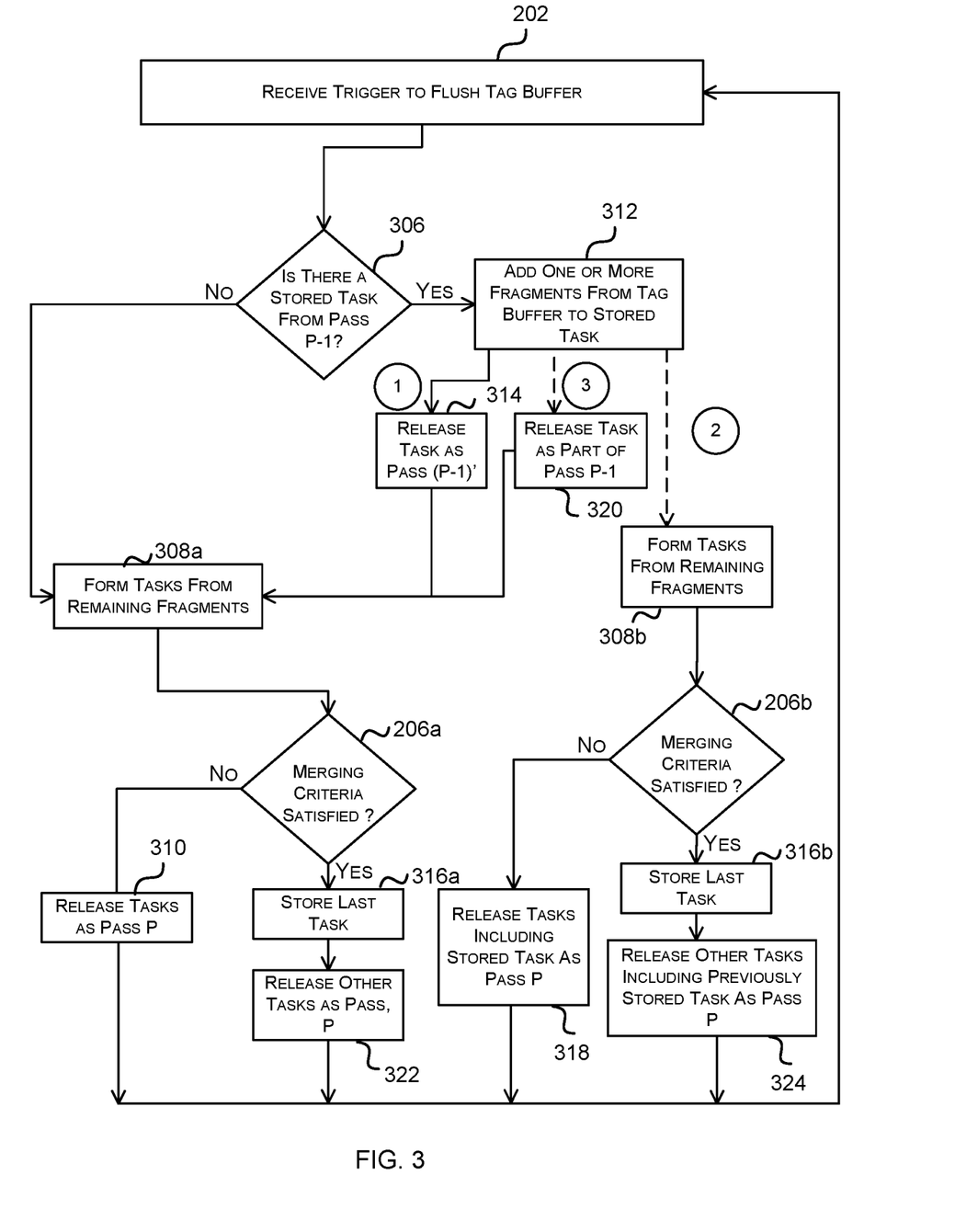
FIG. 3 is a flow diagram of a second example of an improved method of generating tasks that may be implemented in the pipeline 100 of FIG. 1.

FIG. 3 is a flow diagram of a second example of the improved method of generating tasks which provides more implementation detail. Like the method of FIG. 2, the method of FIG. 3 starts with a trigger to flush the tag buffer (block 202).

If there is a stored last task that was generated by the previous tag buffer flush ('Yes' in block 306), then one or more fragments from the current tag buffer flush are added (where possible) to the stored task (block 312). As noted above, there may be one or more predefined criteria (referred to as 'addition criteria') that must be satisfied by a fragment if it is to be added to the stored task (in block 312).

Once the stored task is full or it is not possible to add any further fragments to the task for another reason (e.g. as a consequence of the limit on the number of primitives or primitive blocks and/or overlapping fragments) then the method may proceed one of three ways (labelled 1, 2 and 3 in FIG. 3) and different implementations may utilise a fixed one of these three ways or may comprise decision logic that is arranged to switch between any two, or all three, of these ways dependent upon the particular circumstances (e.g. where possible, the second or third way may be used, with the first way only being used if it is not possible to use the second and/or third way for reasons set out below).

In the first of the three different ways to proceed, 1, the further (i.e. more fully) populated stored last task is released as a separate pass, pass (P-1)' (block 314). This pass (pass (P-1)') is directly after the pass containing the other tasks from the previous tag buffer flush (pass (P-1)). The remaining fragments from the current tag buffer flush are then formed into tasks (block 308a) and it is determined whether the merging criteria are satisfied (block 206a). These criteria are as described above with reference to FIG. 2 and firstly determine whether the trigger (received in block 202) is not at the end of a tile and secondly define some criteria in relation to the last task that was generated (in block 308a). If the merging criteria are not satisfied ('No' in block 206a), then the tasks (formed in block 308a) are released as the next pass, pass P (block 310). If the merging criteria are satisfied ('Yes' in block 206a), then the last task is stored (block 316a) and the other tasks from the current tag buffer flush are released as pass P (block 322).

In the second of the three different ways to proceed, 2, a number of tasks are created from the remaining fragments (block 308b) and it is determined whether the merging criteria are satisfied (block 206b). These criteria are as described above with reference to FIG. 2 and block 206a. If the merging criteria are not satisfied ('No' in block 206b), then the tasks, including the stored task, are released as the next pass, pass P (block 318). If the merging criteria are satisfied ('Yes' in block 206b), then the newly created last task is stored (block 316b) and the other tasks, including the previously stored, and now further populated task are released as pass P (block 324). As described above, the further populated stored last task (generated in block 312) can only be merged forwards into pass P (i.e. the second way, 2, can only be used) if there is no overlap of fragments between that task and any other task in pass P.

In the third of the three different ways to proceed, 3, the further populated stored last task (as generated in block 312) is merged backwards into pass P-1. This is achieved by releasing the further populated stored last task once generated as part of the same pass as the other tasks formed from fragments in the previous tag buffer flush (block 320). The remaining fragments from the current tag buffer flush are then formed into tasks (block 308a) and it is determined whether the merging criteria are satisfied (block 206a). These criteria are as described above with reference to FIG. 2 and the first way to proceed, 1. If the merging criteria are not satisfied ('No' in block 206a), then, as described above, the tasks (formed in block 308a) are released as the next pass, pass P (block 310). If the merging criteria are satisfied ('Yes' in block 206a), then the last task is stored (block 316a) and the other tasks from the current tag buffer flush are released as pass P (block 322).

The further populated stored last task can only be merged backwards into pass P-1 (i.e. the third way, 3, can only be used) if there is no overlap of fragments between that task and any other task in pass P-1. As the other tasks in pass P-1 have already been released by the time at which fragments are added to the stored last task (in block 312), an additional data structure is generated prior to the release of the other tasks in pass P-1 (e.g. in a previous iteration of the method of FIG. 3) to enable checks to be made at the time extra fragments are being added to the stored last task (in block 312). This data structure, which may be referred to as a previous-pass mask, identifies all the fragments that are included in a pass and this is checked against the fragments added to the stored last task to identify any overlap (i.e. any fragments at the same sample position). In the event of an overlap, the more fully populated last task cannot be merged backwards. In variations on the methods described herein, this additional data structure may, in addition, or instead, be used to assist in identifying fragments to add to the stored task in block 312 (e.g. in order to increase the probability of using the second way, 2, described above); however, this may also require the tracking of fragments that are not selected (e.g. so that those fragments that have been skipped can be revisited later).

As shown in FIG. 3, the method is repeated for subsequent tag buffer flushes.

As described above, the method of FIG. 3 shows three alternative implementations for a part of the method (labelled 1-3 in FIG. 3). In the first option (1), the more fully populated stored last task proceeds as a separate pass (i.e. separate from both the pass containing the other fragments from the previous tag buffer flush and the pass containing the other fragments from the next tag buffer flush). This requires the least additional logic to implement because there are no additional overlap checks except for those performed when adding fragments to more fully populate the stored task. However, the addition of a pass may result in additional delays, because as described above, all the tasks in a pass must complete before any tasks in a subsequent pass. For example, where the last task of pass P-1 was released as part of pass P-1, then that task can be executed at the same time as other tasks in pass P-1, whereas if, under option (1), that last task was not released as part of task P-1 but was instead stored and then released as a separate pass, pass (P-1)' (in block 314), then that task has to wait until all the tasks that were in pass P-1 when released have finished updating the depth buffer. Both the second and third options (2, 3), which involve merging the more fully populated stored last task either forwards or backwards, eliminate the need for an additional pass and the second option (merging forwards, 2) is less complex to implement than the third option (merging backwards, 3) because it does not require an additional data structure (the previous-pass mask) in order to be able to perform overlap checks.

In various examples, a pipeline may be arranged to implement more than one of the three options (1-3) and this provides additional flexibility. For example, in a pipeline that is capable of implementing all three options, if possible, the more fully populated stored last task is merged forwards (option 2); however if this is not possible, the additional data structure is checked to see if the more fully populated stored last task can be merged backwards (option 3). Only if the more fully populated stored last task cannot be merged either forwards or backwards, is it sent as a separate pass (option 1). In another example, a pipeline may be capable of implementing the first option (1) and either the second (2) or third option (3).

Where the more fully populated stored last task is merged either forwards (option 2) or backwards (option 3), it may be necessary to transform primitive indices and/or consolidate data from separate look-up tables (LUTs). For example, in order to reduce the size of the tag buffer, the primitive indices that are stored in the tag buffer may not be unique (and hence may be referred to as LUT indices, where these indices relate to primitives) and the primitive indices (but not the data) may be re-used following a tag buffer flush. If a tag buffer has a limit of N primitives, indices 0 to N-1 may be stored in the tag buffer (where these indices may comprise fewer bits than the unique primitive identifiers) and a mapping between the indices used in the tag buffer and the actual (unique) primitive identifier may be stored in a LUT, with each pass having a separate LUT (where these LUTs may be referred to as primitive LUTs to differentiate them from other LUTs that may be used in the GPU pipeline). Consequently primitive 0 in one tag buffer flush will not necessarily refer to the same primitive as primitive 0 in a subsequent or previous tag buffer flush. In such examples, where the more fully populated stored last task is merged either backwards or forwards, the mapping data (e.g. from LUT index to primitive ID) required by that more fully populated stored last task may be transformed, if needed, and added to the LUT for the pass into which it is merged. In an example, if a primitive has LUT index 3 in the first tag buffer flush and LUT index 1 in the subsequent tag buffer flush, the mapping of this primitive may be updated from 1 to 3 if the more fully populated stored last task is merged backwards (option 3) and from 3 to 1 if the more fully populated stored last task is merged forwards (option 2). More generally, when the mapping data is transformed it is updated to include the LUT index for the primitive in the pass that the task is being merged into, irrespective of whether the primitive existed in the previous pass (and hence does not have a prior LUT index) or not.

As described above, one of the criteria that determine whether a fragment from a tag buffer flush can be added to the stored last task from the immediately previous tag buffer flush is whether the limit on the number of primitive blocks per task is exceeded. In many examples this limit is set to one primitive block per task. In various examples, this limit may alternatively be set to two primitive blocks per task and in such examples there is a higher probability that fragments can be added to the stored last task and hence a higher probability that the stored last task can be fully populated with fragments. However, permitting two primitive blocks per task requires the task to be able to store pointers to two different primitive blocks (e.g. pointers to two allocations of local storage, which may be referred to as a 'coefficient store', one allocation for each primitive block) and may require additional local storage (e.g. because a task of a subsequent pass cannot reuse the allocation of a stored last task even if they relate to the same primitives from the same primitive block). In various examples this relaxation of the limit on the number of primitive blocks per task from one to two may only apply to stored last tasks and not to other tasks that are generated following a tag buffer flush. In other examples, the same limit on primitive blocks per task may be used for all tasks that are generated. Where the fragments added can be from a different primitive block to the original fragments in the stored last task (i.e. a different primitive block to the fragments added from the previous tag buffer flush), it may not be necessary to transform primitive data in the primitive LUT since any difference in primitive indexing can be accommodated by the second primitive block pointer e.g. a primitive may be uniquely identified by two LUT indexes: an index to the primitive LUT and an index to the primitive block LUT.

Whilst the methods described above limit tasks such that any task cannot contain overlapping fragments, if the pipeline in which the methods are implemented enforces in-order processing of instances (i.e. fragments) within a task (e.g. within the TSU) and with regards to output buffer and depth buffer updates (such that updates are executed in the same order the instances were added to the task), then this requirement can be relaxed and overlap checks omitted when adding fragments to the stored task.

By allowing multiple primitive blocks per task and/or intra-task fragment overlap, the overall efficiency increase that is achieved by using the methods described herein is increased because there is a higher probability of more fully populating the stored last task.

In variations of the methods described above, the addition of fragments to further populate a stored task (in blocks 210 and 312) may be implemented at a predefined granularity, e.g. in blocks of fragments (e.g. 2×2 blocks of fragments) and this may result in simpler calculations (and hence reduced hardware to perform these calculations) and the previous-pass mask may be smaller (and hence require less memory to store). However, by reducing the granularity at which fragments are added (i.e. by adding more than one fragment at a time), and assessments made to determine whether fragments (or groups thereof) can be added to a stored task, reduces the efficiency because the further populated task will be more likely to be less full than where fragments are added individually.

Figure 4:
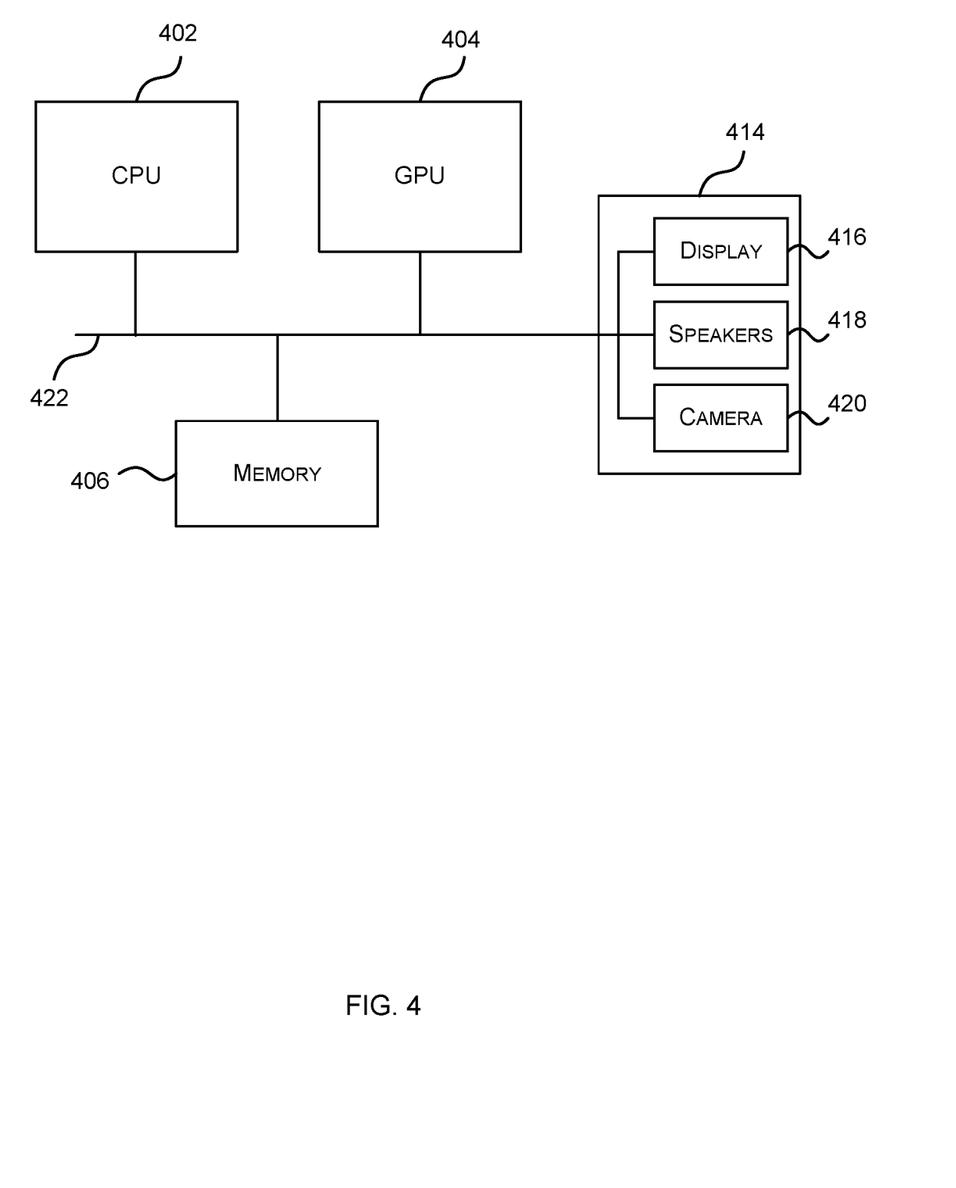
FIG. 4 shows a computer system in which the graphics pipeline is implemented.

FIG. 4 shows a computer system in which the methods described herein may be implemented. The computer system comprises a CPU 402, a GPU 404, a memory 406 and other devices 414, such as a display 416, speakers 418 and a camera 420. The GPU 404 may comprise a pipeline (e.g. as shown in FIG. 1) that implements a method as described herein. The components of the computer system can communicate with each other via a communications bus 422.

The system of FIG. 4 and the pipeline 100 of FIG. 1 are shown as comprising a number of functional blocks. This is schematic only and is not intended to define a strict division between different logic elements of such entities. Each functional block may be provided in any suitable manner. It is to be understood that intermediate values described herein as being formed by a functional block need not be physically generated by the particular functional block at any point and may merely represent logical values which conveniently describe the processing performed by the system or pipeline between its input and output.

The graphics pipeline described herein may be embodied in hardware on an integrated circuit. The graphics pipeline described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics pipeline configured to perform any of the methods described herein, or to manufacture a graphics pipeline comprising any apparatus described herein. An integrated circuit definition dataset may be, for example, an integrated circuit description.

Therefore, there may be provided a method of manufacturing, at an integrated circuit manufacturing system, a graphics pipeline as described herein. Furthermore, there may be provided an integrated circuit definition dataset that, when processed in an integrated circuit manufacturing system, causes the method of manufacturing a graphics pipeline to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics pipeline will now be described with respect to FIG. 5.

Figure 5:
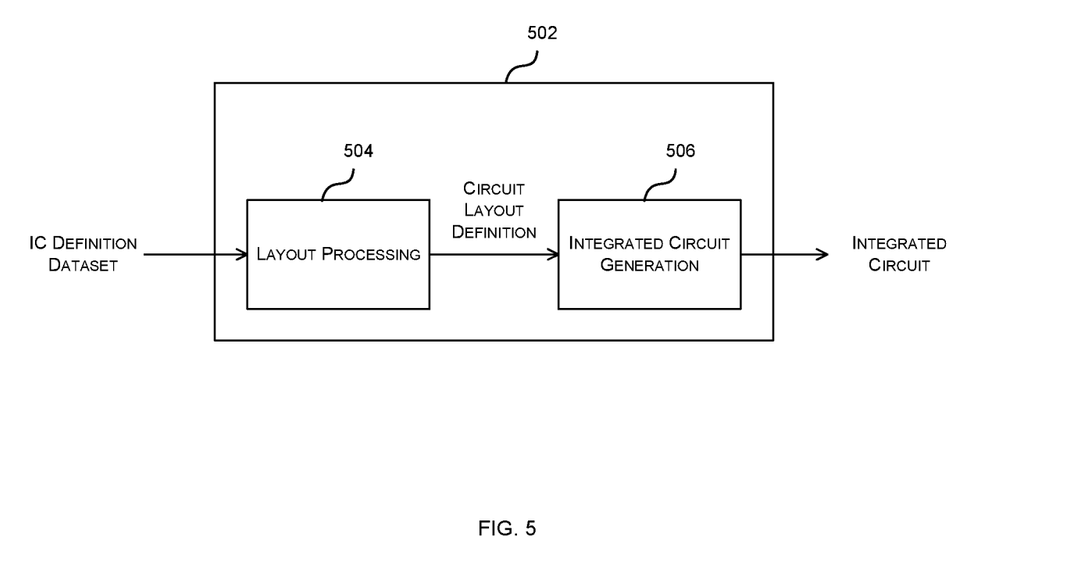
FIG. 5 shows an integrated circuit manufacturing system for generating an integrated circuit embodying a graphics pipeline as described herein.

FIG. 5 shows an example of an integrated circuit (IC) manufacturing system 502 which is configured to manufacture a graphics pipeline as described in any of the examples herein. In particular, the IC manufacturing system 502 comprises a layout processing system 504 and an integrated circuit generation system 506. The IC manufacturing system 502 is configured to receive an IC definition dataset (e.g. defining a graphics pipeline as described in any of the examples herein), process the IC definition dataset, and generate an IC according to the IC definition dataset (e.g. which embodies a graphics pipeline as described in any of the examples herein). The processing of the IC definition dataset configures the IC manufacturing system 502 to manufacture an integrated circuit embodying a graphics pipeline as described in any of the examples herein.

The layout processing system 504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 504 has determined the circuit layout it may output a circuit layout definition to the IC generation system 506. A circuit layout definition may be, for example, a circuit layout description.

The IC generation system 506 generates an IC according to the circuit layout definition, as is known in the art. For example, the IC generation system 506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 502 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics pipeline without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 5 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 5, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein.

Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of generating tasks in a tile-based graphics pipeline, the method comprising, subsequent to a trigger to flush a tag buffer:
    generating one or more tasks from the flushed tag buffer, each task comprising a reference to a program and one or more fragments on which the program is to be executed, wherein a fragment is an element of a primitive at a sample position;
    determining whether predefined merging criteria are satisfied; and
    in response to determining that the merging criteria are satisfied, adding one or more fragments from a next tag buffer flush to a last task of the one or more tasks generated from the flushed tag buffer.

2. The method according to claim 1, wherein the merging criteria comprises a condition that the trigger to flush the tag buffer is not an end of a tile.

3. The method according to claim 1, wherein the merging criteria comprises an occupancy threshold for the last task generated from the flushed tag buffer.

4. The method according to claim 3, wherein primitives are grouped into primitive blocks and the occupancy threshold is defined in terms of one or more of:
    a maximum number of fragments in the task;
    a maximum number of primitives in the task; and
    a maximum number of primitive blocks in the task.

5. The method according to claim 1, wherein adding one or more fragments from the next tag buffer flush to the last task of the one or more tasks generated from the flushed tag buffer comprises:
    storing the last task of the one or more tasks generated from the flushed tag buffer; and
    subsequent to a next trigger to flush the tag buffer, adding one or more fragments from the next tag buffer flush to the stored last task.

6. The method according to claim 5, wherein adding one or more fragments from the tag buffer flush to the stored last task comprises:
    selecting a fragment from the tag buffer flush;
    determining whether the selected fragment satisfies predefined addition criteria; and
    in response to determining that the selected fragment satisfies the predefined criteria, adding the selected fragment to the stored last task.

7. The method according to claim 6, wherein the predefined addition criteria are configured to perform any one or more of:

specifying a maximum number of primitives per task;
specifying a maximum number of primitive blocks per task, wherein primitives are grouped into primitive blocks;
preventing intra-task overlap of fragments; and
preventing inter-task overlap of fragments.

8. The method according to claim 1, wherein the method further comprises, in response to the trigger to flush the tag buffer and prior to generating the one or more tasks from the flushed tag buffer:
determining whether there is a stored last task from an immediately previous tag buffer flush; and
in response to determining that there is a stored last task from an immediately previous tag buffer flush, adding one or more fragments from the tag buffer to the stored last task.

9. The method according to claim 8, wherein the graphics pipeline comprises a depth buffer, a pass comprises a group of one or more tasks, the graphics pipeline enforces that all tasks from a pass finish updating the depth buffer prior to any tasks from a next pass updating the depth buffer and the method further comprises, after adding one or more fragments from the tag buffer to the stored last task, releasing the stored last task as a separate pass.

10. The method according to claim 8, wherein the graphics pipeline comprises a depth buffer, a pass comprises a group of one or more tasks, the graphics pipeline enforces that all tasks from a pass finish updating the depth buffer prior to any tasks from a next pass updating the depth buffer and the method further comprises, after adding one or more fragments from the tag buffer to the stored last task to generate a further populated stored last task and in response to determining that there is no overlap in fragments between the further populated stored last task and any tasks in a pass comprising at least one other task generated in response to the immediately previous tag buffer flush, releasing the further populated stored last task as part of that pass.

11. The method according to claim 10, further comprising, in response to determining that there is an overlap in fragments between the further populated stored last task and any tasks in a pass comprising at least one other task generated in response to the immediately previous tag buffer flush, releasing the further populated stored last task as a separate pass.

12. The method according to claim 8, wherein the graphics pipeline comprises a depth buffer, a pass comprises a group of one or more tasks, the graphics pipeline enforces that all tasks from a pass finish updating the depth buffer prior to any tasks from a next pass updating the depth buffer and the method further comprises, after adding one or more fragments from the tag buffer to the stored last task to generate a further populated stored last task and in response to determining that there is no overlap in fragments between the further populated stored last task and any tasks in a pass comprising at least one other task generated in response to the trigger to flush the tag buffer, releasing the stored last task as part of the that pass.

13. The method according to claim 12, further comprising, in response to determining that there is an overlap in fragments between the further populated stored last task and any tasks in a pass comprising at least one other task generated in response to the trigger to flush the tag buffer and that there is no overlap in fragments between the further populated stored last task and any tasks in a pass comprising at least one other task generated in response to the immediately previous tag buffer flush, releasing the further populated stored last task as part of the pass comprising at least one other task generated in response to the immediately previous tag buffer flush.

14. The method according to claim 12, further comprising, in response to determining that there is (a) an overlap in fragments between the further populated stored last task and any tasks in a pass comprising at least one other task generated in response to the trigger to flush the tag buffer and/or (b) that there is an overlap in fragments between the further populated stored last task and any tasks in a pass comprising at least one other task generated in response to the immediately previous tag buffer flush, releasing the further populated stored last task as a separate pass.

15. A tile-based graphics pipeline comprising:
a tag buffer; and
hardware logic arranged, subsequent to a trigger to flush the tag buffer, to:
generate one or more tasks from the flushed tag buffer, each task comprising a reference to a program and one or more fragments on which the program is to be executed, wherein a fragment is an element of a primitive at a sample position;
determine whether predefined merging criteria are satisfied; and
in response to determining that the merging criteria are satisfied, add one or more fragments from a next tag buffer flush to a last task of the one or more tasks generated from the flushed tag buffer.

16. The tile-based graphics pipeline according to claim 15, wherein the hardware logic is located within the tag buffer.

17. The tile-based graphics pipeline according to claim 15, further comprising a texture/shading unit and wherein the hardware logic is located between the tag buffer and the texture/shading unit.

18. A non-transitory computer readable storage medium having stored thereon computer readable instructions that when executed by a processor, cause the processor to:
generate one or more tasks from a flushed tag buffer, each task comprising a reference to a program and one or more fragments on which the program is to be executed, wherein a fragment is an element of a primitive at a sample position;
determine whether predefined merging criteria are satisfied; and
in response to determining that the merging criteria are satisfied, add one or more fragments from a next tag buffer flush to a last task of the one or more tasks generated from the flushed tag buffer.

19. A non-transitory computer readable storage medium having stored thereon an integrated circuit definition dataset that, when processed in an integrated circuit manufacturing system, configures the integrated circuit manufacturing system to manufacture a graphics pipeline as set forth in claim 15.

* * * * *